United States Patent Office 3,177,050
Patented Apr. 6, 1965

3,177,050
RECOVERY OF ELEMENTAL IODINE WITH A
FLUIDIZED ION EXCHANGE BED
James J. Houy, Long Beach, Calif., assignor to The Dow
Chemical Company, Midland, Mich., a corporation of
Delaware
No Drawing. Filed Apr. 17, 1963, Ser. No. 273,554
6 Claims. (Cl. 23—216)

This invention concerns a novel process for the recovery of iodine from an aqueous solution by adsorption with an anion exchange resin. More particularly, it relates to an improved process for recovery of iodine from dilute aqueous solutions by upflow feed of the iodine solution to maintain at least a portion of the anion exchange bed in a fluidized condition during the loading cycle.

The adsorption of elemental bromine and iodine by anion exchange resins was reported by Aveston and Everest in Chem. and Ind., 1238 (1957), who noted that the polyhalide anion, $X_n^-$ (wherein X is Cl, Br, I, or mixtures thereof and $n$ is an integer from 3 to 7) was the predominant species formed in the resin phase when a strongly basic anion exchange resin was contacted with an aqueous solution containing elemental bromine or iodine. When excess halogen was employed, the predominant polyhalide species was $X_7^-$, i.e., $3X_2 \cdot X^-$, indicating the adsorption of 3 moles of halogen per ion exchange group.

The utility of such polyhalide resins in the recovery of iodine is clearly demonstrated by Mills in United States Patent 3,050,369. Although the iodine adsorbed by the anion exchange resin is not stripped from the column with water, it is readily eluted with an aqueous solution of a reducing agent such as sulfur dioxide or sodium bisulfite.

In the conventional operation of ion exchange columns, it is widely recognized that downflow feed is preferred during the loading cycle. Since the bed remains compact as the feed solution flows down through the column, maximum resin-solution contact is achieved with a minimum of mechanical problems. However, the feed solution must be essentially free of insoluble materials because an ion exchange bed is a very effective filter and an accumulation of insoluble materials at the top of the bed causes plugging of the column with an accompanying rapid increase in pressure drop and poor utilization of the resin.

By using an upflow feed during the loading cycle such plugging of the column can be minimized. But because of the low density of commercial ion exchange resins, upflow operation at most practical flow rates causes considerable loosening and expansion of the resin bed if not actual fluidization. The net result of such upflow operation is a decrease in the efficiency of resin utilization as well as a potential loss of resin. While systems of retaining screens, baffle plates, pulsating means and other special techniques, have been suggested to prevent fluidization of the bed, such systems have been too complex for general use.

In the recovery of iodine from natural brines, large volumes of brines must be processed because of the very low iodine content of such brines, often only 50 to 150 p.p.m. as iodides. Generally, after pretreating the brine by screening, settling and filtering to remove the bulk of the suspended impurities such as silt, sand, oil, etc., the brine is oxidized with chlorine under controlled conditions to release the elemental iodine. However, because of the low concentration of iodine in the oxidized brine, a concentration step is required before final recovery of elemental iodine.

For this intermediate concentration, anion exchange resin columns are highly effective. The large volumes of brine are easily handled and the efficiency of iodine removal from dilute solutions is high. Using conventional strongly basic quaternary ammonium anion exchange resins, 4,000 or more bed volumes of brine having an iodine content of about 100 p.p.m. can be treated before the resin capacity is exceeded. Furthermore, regeneration of the resin and recovery of the iodine is also readily accomplished.

In practice it has been found that before the oxidized brine can be fed to an anion exchange column operating in the conventional downflow manner, it must be further clarified or polished by careful refiltration to remove residual traces of insoluble materials. Without this further clarification, columns operating with downflow feed are rapidly plugged.

It has now been discovered that by operating the anion exchange column with an upflow feed of the oxidized brine or other aqueous solution containing elemental iodine, loading of the column can be accomplished smoothly, rapidly, and efficiently without plugging the resin bed even when the final clarification so essential for downflow operation is omitted. Because of this discovery, it is possible to effect an appreciable operating economy in the recovery of iodine from natural brines by eliminating the need for further clarification after the oxidation step.

It has been further discovered that simple upflow operation of an anion exchange column with an aqueous solution containing iodine results in a column having the smooth loading gradient of a fixed bed even though during the loading cycle the column is visibly fluidized. Obviously, to achieve this smooth loading gradient, effective multiple contact is being obtained even within the fluidized zone. When a glass column is employed to permit visible observation of the behavior of the resin bed, the movement of the fluidized resin is seen to be restricted to a series of visible, rather well defined zones within the column rather than as random unlimited movement throughout the entire length of the column.

In view of the prior knowledge of the operating characteristics of ion exchange columns, the present discovery that simple upflow operation combines the characteristic fluid bed freedom from the plugging and channeling characteristics of fluidized bed operations with the loading behavior of a fixed bed is most unexpected and surprising. This discovery permits the efficient concentration of iodine from an aqueous solution by adsorption with an anion exchange resin without the extensive clarification formerly required to remove essentially all traces of insoluble materials.

The invention described herein is thus an improvement in a process for the recovery of elemental iodine wherein iodine is removed as a polyhalide anion from an aqueous solution containing iodine by an anion exchange resin. The improvement consists of: (1) introducing the aqueous solution containing iodine at the lower end of an anion exchange resin column; (2) causing the aqueous solution to flow upwardly through the resin bed at a flow rate sufficient to fluidize at least a portion of the resin bed and to establish and maintain in the resin bed a downwardly increasing gradient of resin in the polyhalide form; and (3) continuing said upflow feed until the resin bed is loaded to the desired degree with iodine.

The unexpected results of the present novel process are believed largely attributable to the appreciable density difference between the resin in its initial halide form and in its loaded polyhalide form. Observations with an iodine solution introduced at the bottom of a quaternary ammonium anion exchange resin held in a glass column indicate that at an upflow rate of greater than 0.5 gallon per minute per square foot of resin bed cross-sectional area (g.p.m./ft.$^2$), visible fluidization of the bed occurs. As the density of the resin beads increases through adsorption of iodine the heavier beads fall downwardly in the column countercurrently to the feed solution, thus providing additional mixing and contact. As the density increases through further loading, the resin beads finally drop from the fluid zone to form a stationary bed at the lower end of the column which gradually increases to include most of the resin. Adsorption of iodine from fresh feed solution continues even in the stationary portion in the lower end of the column until saturation is reached. Thus, a downward increasing gradient of resin in the polyhalide form is established and maintained throughout the resin bed in both the fluid and static zones.

When a transparent column support is used, this gradient is clearly visible during the loading cycle. During the early stages of the loading cycle with an iodine solution the color of the resin ranges from the light yellow of the unloaded resin at the top of the column to nearly black at the bottom where the resin is essentially completely in the polyiodide form. As the loading increases, the black band traverses slowly up the column.

The gradient is also shown by the analysis of resin samples taken from various levels of a partially loaded resin bed. For example, in one typical run, the iodine content of the resin was found to vary from 50.3 pounds of iodine per cubic foot of wet settled resin at the base of the resin column to 8.6 pounds per cubic foot of wet settled resin at the top.

In the practice of this invention the ion exchange resins used are preferably strongly basic, quaternary ammonium anion exchange resins of the type described by McBurney in United States Patent 2,591,573 and by Bauman and McKellar in United States Patent 2,614,099. The weakly basic polyamine anion exchange resins of the type described by McBurney in United States Patent 2,591,574 may also be employed in this process, but the polyhalide form of these resins is less stable than that of the quaternary ammonium resins. In general, most commercial anion exchange resins have a poly(vinylbenzyl) backbone with divinylbenzene crosslinking units to provide the necessary degree of dimensional stability and water insolubility for the polymer. The functional quaternary ammonium or polyamine groups are attached to the benzyl groups, usually by reaction of an intermediate poly(vinylbenzyl halide) resin with an appropriate organic amine such as trimethylamine or dimethylethanolamine.

The resins utilized according to the present novel process are usually available as uniform granular beads in the chloride or hydroxide form. The preferred bead size is 20 to 100 mesh. While the chloride form is most commonly available, any form of anion exchange resin may be employed so long as the anionic component is exchangeable by iodide or polyiodide anions. Conversion from one anionic form to another is readily accomplished by well-known ion exchange techniques when necessary. However, hydrolysis of iodine in the aqueous solution is gnerally sufficient to convert the resin to the iodide form.

The source of the aqueous iodine containing solution is immaterial to the present process. Any aqueous solution containing elemental iodine in a sufficient concentration to be economically recoverable may be used in the practice of this invention. Oil well salt brines containing 70 to 120 p.p.m. iodine are particularly suitable for the recovery of iodine. Since by appropriate control of the oxidization conditions iodine can be selectively oxidized in the presence of bromides and other salts, many other salt brines can also be used for the recovery of iodine.

For the recovery of iodine from natural brines, the pH of the brine is adjusted to between 2 and 3 after the initial clarification process. Then chlorine is bubbled into the brine in an amount sufficient to raise the E.M.F. potential of the brine to a value between 0.50 and 0.56 volt, preferably between 0.535 and 0.555 volt, as measused by platinum-calomel electrodes. The resulting oxidized brine is suitable for treatment with an anion exchange resin as described herein to remove the iodine.

The present novel process may be carried out in conventional ion exchange equipment adapted for feed at the lower end of the anion exchange resin column. For efficient utilization of the resin, the bed is preferably at least as deep or deeper than it is wide, i.e., the height to width ratio of the column is at least one. Carry-over loss of resin is prevented by using a screen or settling chamber at the top of the resin column.

To fluidize at least a portion of the bed as well as to provide practical operation, a minimum upflow feed rate of 1 g.p.m./ft.$^2$ is required. In practice feed rates of about 3 to 5 g.p.m./ft.$^2$ are preferred although rates as high as 10 g.p.m./ft.$^2$ have been used without serious attrition of the resin. Optimum flow rates depend in part on the density of both the feed solution and the initial resin. Since the density of the resin increases during the loading cycle, the feed rate can be increased somewhat if desired as the loading proceeds. Optimum flow rates within the scope of this invention are easily determined by observation of the column behavior.

The loading cycle is generally continued until the resin is loaded to a desired degree, usually to the breakthrough point when the concentration of residual iodine in the effluent rises above a desired level. A commercial quaternary ammonium anion exchange resin with an exchange capacity of about 1.3 meq./ml. of wet resin has a theoretical capacity of about 65 lbs. iodine per cubic foot of wet settled resin. However, with dilute feed solutions, generally only 40 to 85 percent of the theoretical capacity is used before breakthrough occurs. Yet the resin capacity is such that several thousand bed volumes of a natural brine containing 50 to 150 p.p.m. iodine can be passed through a single column before regeneration is required. By employing a series of two or more resin columns with the final column having regenerated or lightly loaded resin, more complete loading of the preceding column is obviously possible without serious loss of iodine in the final effluent.

Recovery of iodine from the anion exchange resin in the polyhalide form is readily accomplished using known elution methods. Preferably the resin is eluted with an aqueous solution containing a reducing agent such as sulfur dioxide or sodium bisulfite. Such treatment gives an eluent containing as much as 10 to 12 weight percent iodine, a concentrate well suited for subsequent isolation of iodine by conventional finishing methods.

The overall efficency of the described process is illustrated by a 96 percent recovery of elemental iodine from an initial solution containing about 110 p.p.m. iodine.

It is evident that this process can be carried out employing one or more anion exchange resin columns with multiple beds connected in series or in parallel. The process can be operated in a cyclic manner with alternate loading and regeneration of the anion exchange column. As another variation, heavily loaded beads at the base of the resin column can be removed from the loading column, stripped and regenerated in a separate recovery unit, and then returned to the top of the loading column, thereby achieving continuous or semi-continuous operations with a single loading column.

The following example illustrates a representative specific embodiment of the invention described herein.

*Example I*

A. A 4 inch diameter ion exchange column was loaded to a depth of 48 inches with a commercial, strongly basic, quaternary ammonium anion exchange resin having a total exchange capacity of 1.33 meq./ml. wet resin (Dowex 1–8X resin, chloride form, 20–50 mesh). A retaining screen was placed at the top of the column with free-board space between the settled resin and the screen.

Then an oxidized oil well brine having a specific gravity of 1.03 and containing 110 p.p.m. of elemental iodine was fed into the bottom of the column at a rate of 3.4 g.p.m./ft.² The resin bed expanded to fill the free-board space and visible fluidization of a portion of the bed occurred. As the feed continued at this rate, distinct resin color bands varying from black near the bottom of the column to light brown near the top of the column were observed with the dark band slowly progressing up the column.

The effluent from the column during the first 3,260 bed volumes of feed contained an average of about 4 p.p.m. iodine with a value of about 1 p.p.m. in several portions. After another 958 bed volumes passed through the column, the residual iodine content in the effluent increased to 11.8 p.p.m. and the feed was stopped. The average iodine content in the effluent during this latter part of the loading cycle was 8 p.p.m. A total of 95.3% of the iodine content of the solution fed to the column was removed by the anion exchange resin.

Analysis of samples taken from the loaded resin bed showed a downwardly increasing gradient of polyhalide resin with an iodine content ranging from 0.55 meq. $I_2$/ml. wet resin at the top of the column to 3.20 meq. $I_2$/ml. wet resin at the base. The latter value corresponds to a loading of about 80% of the theoretical capacity. The entire bed had an average loading of about 45% of capacity. The density of the resin at the base of the loaded column was about 1.60 g./ml. wet resin compared to an initial density of about 0.64 g./ml. wet resin, Cl⁻ form.

Treatment of the loaded anion exchange column with two portions of an aqueous 6% sodium chloride solution saturated with sulfur dioxide removed the iodine and restored the column to the chloride form. The first portion of regenerant solution contained 12 wt. percent iodine as iodide after passing through the loaded resin column. A total overall recovery of about 94% of the initial iodine fed to the column was achieved. In other runs recoveries as high as 96% were obtained.

B. When the same aqueous iodine feed solution is used in a downflow loading operation, the resin bed is rapidly plugged unless the solution is further clarified before passing into the anion exchange column.

C. Similar recoveries of iodine were also achieved when an oxidized salt brine having a specific gravity of about 1.27 and containing 40 p.p.m. iodine was fed upwardly through an anion exchange resin as described in Example IA. At high feed rates the resin bed was lifted from the lower retaining screen leaving a fairly clear liquid zone below the fluidized resin. As the resin became loaded with iodine, the heavier beads dropped through this intermediate zone to form a stationary bed at the lower end of the column.

I claim:
1. In a process for the recovery of elemental iodine wherein iodine is removed as a polyhalide anion from an aqueous solution containing iodine by an anion exchange resin, the improvement which consists of:
   (1) introducing the aqueous solution containing iodine at the lower end of an anion exchange resin column;
   (2) causing the aqueous solution to flow upwardly through the resin bed at a flow rate sufficient to fluidize at least a portion of the resin bed and to establish and maintain in the resin bed a downwardly increasing gradient of resin in the polyhalide form; and
   (3) continuing said upflow feed until the resin bed is loaded to the desired degree with iodine.
2. The process of claim 1 wherein the anion exchange resin is a strongly basic, quaternary ammonium anion exchange resin.
3. The process of claim 1 wherein the anion exchange resin is a quaternary trimethylammonium resin.
4. The process of claim 1 wherein the aqueous solution containing elemental iodine is prepared by oxidation of a naturally occurring brine.
5. The process of claim 1 wherin the aqueous solution is fed upwardly through the resin bed at a flow rate of from 1 to 10 gallons per minute per square foot.
6. The process of claim 1 wherein the aqueous solution is fed upwardly through the resin bed at a flow rate of from 3 to 5 gallons per minute per square foot.

References Cited by the Examiner
UNITED STATES PATENTS

| | | | |
|---|---|---|---|
| 3,037,845 | 6/62 | Hein | 23—216 |
| 3,050,369 | 8/62 | Mills | 23—216 |
| 3,075,830 | 1/63 | Schoenbeck | 23—216 |
| 3,098,716 | 7/63 | Gradishar et al. | 23—217 |

References Cited by the Applicant
UNITED STATES PATENTS

| | | |
|---|---|---|
| 2,945,746 | 7/60 | Shaw. |

OTHER REFERENCES

B. Sansoni: Angew. Chemie, 73, 493 (1961).
M. Ziegler: Angew. Chemie, 71, 283 (1959).

MAURICE A. BRINDISI, *Primary Examiner.*